(12) United States Patent
Hecht et al.

(10) Patent No.: US 11,007,585 B2
(45) Date of Patent: May 18, 2021

(54) SINGLE-SIDED THREE-WAY INDEXABLE MILLING INSERT HAVING HIGH VOID VOLUME TO MATERIAL VOLUME RATIO AND INSERT MILL THEREFOR

(71) Applicant: Iscar, Ltd., Tefen (IL)

(72) Inventors: Gil Hecht, Nahariya (IL); Assaf Ballas, Akko (IL)

(73) Assignee: Iscar, Ltd., Tefen (IL)

( * ) Notice: Subject to any disclaimer, the term of this patent is extended or adjusted under 35 U.S.C. 154(b) by 36 days.

(21) Appl. No.: 16/201,165

(22) Filed: Nov. 27, 2018

(65) Prior Publication Data

US 2019/0160557 A1    May 30, 2019

Related U.S. Application Data

(60) Provisional application No. 62/592,687, filed on Nov. 30, 2017.

(51) Int. Cl.
*B23C 5/20* (2006.01)
*B23C 5/22* (2006.01)
*B23C 5/10* (2006.01)

(52) U.S. Cl.
CPC ............ *B23C 5/2221* (2013.01); *B23C 5/109* (2013.01); *B23C 2200/0477* (2013.01);
(Continued)

(58) Field of Classification Search
CPC ......... B23C 5/109; B23C 5/202; B23C 5/207; B23C 5/2213; B23C 5/2221;
(Continued)

(56) References Cited

U.S. PATENT DOCUMENTS 1,838,520 A * 12/1931 Archer ................ B23B 27/1614
407/104
4,606,248 A * 8/1986 Shikata ................... B23B 27/10
407/114
(Continued)

FOREIGN PATENT DOCUMENTS

DE        3301191 A1 *  7/1984  ......... B23B 27/1622
DE    19703848 A1 *  7/1998  ........... C23C 16/458
(Continued)

OTHER PUBLICATIONS

Description WO2015129770A1 (translation) obtained at https://worldwide.espacenet.com/ (last visited Aug. 13, 2020).*
(Continued)

*Primary Examiner* — Ryan C Rufo
(74) *Attorney, Agent, or Firm* — Womble Bond Dickinson (US) LLP

(57) ABSTRACT

A single-sided three-way indexable milling insert for 90° shoulder milling operations, includes a positive basic shape, a rake surface, a peripheral surface including side abutment surfaces, a base bearing surface and a screw hole connecting the rake and base bearing surfaces. The insert has three main cutting edges which lie along an imaginary equilateral triangle. A material volume $V_F$ of the cutting insert and a void volume $V_S$ of the insert's screw hole fulfill the condition $V_S/V_F \geq 0.30$.

15 Claims, 6 Drawing Sheets

(52) U.S. Cl.
CPC .. *B23C 2200/208* (2013.01); *B23C 2200/286* (2013.01); *B23C 2210/168* (2013.01)

(58) Field of Classification Search
CPC ..... B23C 2200/0411; B23C 2200/0477; B23C 2200/0483; B23C 2200/208; B23C 2200/286; B23B 2200/0419; B23B 2200/0495; B23B 2200/049
See application file for complete search history.

(56) References Cited

U.S. PATENT DOCUMENTS

| | | | | |
|---|---|---|---|---|
| 4,687,383 | A * | 8/1987 | Shimomura | B23C 5/2278 407/46 |
| 4,755,086 | A * | 7/1988 | Stashko | B23B 27/145 407/114 |
| 5,226,761 | A | 7/1993 | Satran et al. | |
| 5,741,095 | A | 4/1998 | Charron et al. | |
| 6,196,770 | B1 * | 3/2001 | Astrom | B23C 5/109 407/40 |
| 8,177,460 | B2 | 5/2012 | Satran et al. | |
| 8,596,935 | B2 * | 12/2013 | Fang | B23B 27/007 408/59 |
| 9,370,833 | B2 | 6/2016 | Saji et al. | |
| 9,764,397 | B2 * | 9/2017 | Aso | B23C 5/109 |
| 2008/0304925 | A1 * | 12/2008 | Meyer | B23B 51/048 408/204 |
| 2011/0044774 | A1 * | 2/2011 | Gustavsson | B23C 5/2221 407/36 |
| 2013/0004251 | A1 * | 1/2013 | Hausmann | B23C 5/207 407/42 |
| 2013/0142581 | A1 * | 6/2013 | Volokh | B23C 5/202 407/114 |
| 2013/0251464 | A1 * | 9/2013 | Hecht | B23C 5/2221 407/48 |
| 2013/0294850 | A1 | 11/2013 | Park | |
| 2015/0202697 | A1 | 7/2015 | Shiota et al. | |
| 2015/0246398 | A1 | 9/2015 | Kawasaki | |
| 2015/0367422 | A1 | 12/2015 | Aso | |
| 2016/0375506 | A1 | 12/2016 | Koike et al. | |
| 2017/0014914 | A1 | 1/2017 | Yamaguchi | |
| 2017/0197257 | A1 * | 7/2017 | Aso | B23C 5/109 |
| 2017/0216940 | A1 | 8/2017 | Aso | |
| 2018/0015554 | A1 | 1/2018 | Roman | |

FOREIGN PATENT DOCUMENTS

| | | | |
|---|---|---|---|
| DE | 19703848 A1 | 7/1998 | |
| EP | 0661122 A1 | 7/1995 | |
| EP | 2998053 A1 * | 3/2016 | ............... B23C 5/06 |
| EP | 3050655131 | 3/2017 | |
| WO | WO 2015/129770 A1 | 9/2015 | |
| WO | WO-2015129770 A1 * | 9/2015 | ........... B23C 5/2221 |

OTHER PUBLICATIONS

International Search Report dated Mar. 19, 2019, issued in PCT counterpart application (No. PCT/IL2018/051280).

Written Opinion dated Mar. 19, 2019, issued in PCT counterpart application (No. PCT/IL2018/051280).

\* cited by examiner

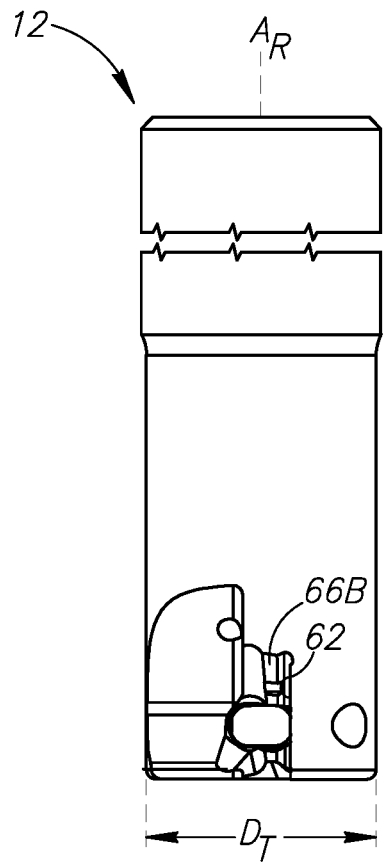
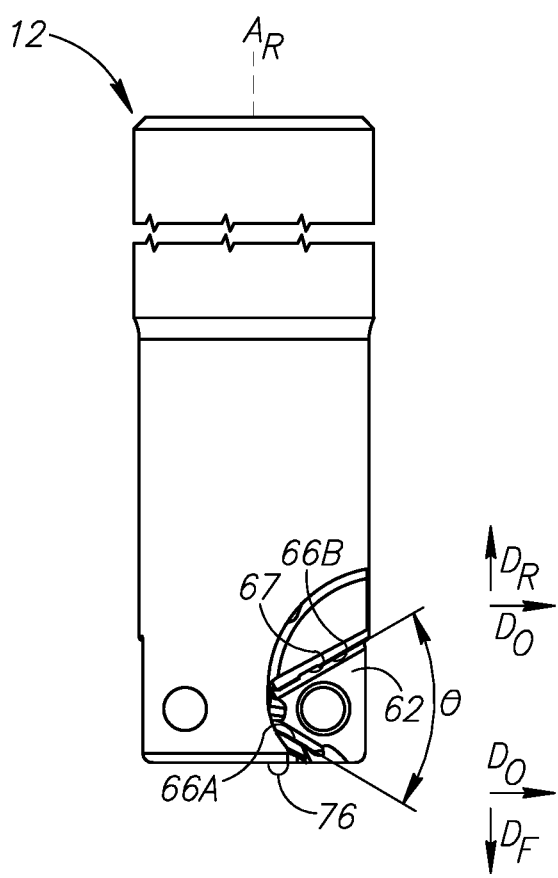
FIG. 7A
FIG. 7B
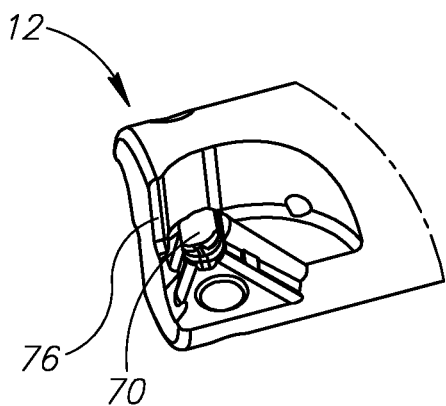
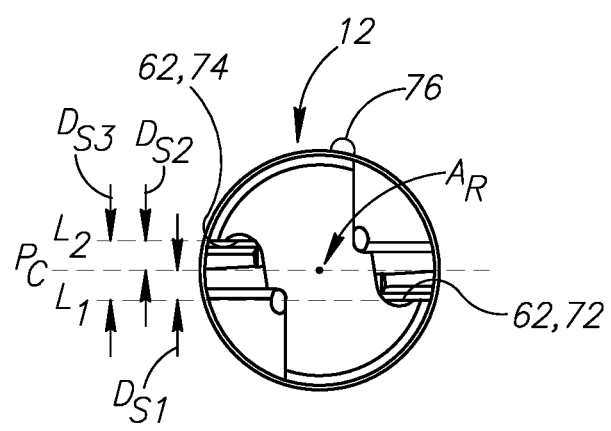
FIG. 7D
FIG. 7C

SINGLE-SIDED THREE-WAY INDEXABLE MILLING INSERT HAVING HIGH VOID VOLUME TO MATERIAL VOLUME RATIO AND INSERT MILL THEREFOR

RELATED APPLICATIONS

The present application claims priority to U.S. Provisional Patent Application No. 62/592,687, filed Nov. 30, 2017, the contents of which are incorporated by reference in their entirety.

FIELD OF THE INVENTION

The subject matter of the present invention relates to insert mills and single-sided three-way indexable milling inserts (hereinafter also "insert(s)") therefor. More particularly to relatively small such inserts and tool holders configured for 90° shoulder milling operations.

BACKGROUND OF THE INVENTION

For the purposes of the present invention, end mills can be theoretically divided into two general groups, namely insert-mills and solid end mills.

Insert-mills are milling tools which comprise tool holders with pockets and replaceable inserts, typically indexable, configured to be mounted in the pockets. An advantage of insert-mills is that the replaceable inserts, which are made of comparatively expensive, harder, material constitutes a relatively small portion of the milling tool. The tool holders comprise a shank which is held securely by a collet or chuck during milling.

Unlike insert-mills which regularly require replacement of small inserts and less regularly require replacement of the tool holder, solid end mills comprise integrally formed teeth and the entire solid end mill is replaced after it is worn. Solid end mills also comprise an integrally formed shank which is held securely by a collet or chuck during milling. Accordingly, solid end mills utilize far more comparatively expensive material than insert-mills. Despite the comparatively higher cost, one of the advantages of solid end mills over insert-mills is that the solid end mill's single integrally formed body can be manufactured with a comparatively smaller diameter (typically less than 20 mm diameter, with smaller diameters being more popular, e.g., at about 12 mm diameter or less) allowing milling in relatively smaller locations than is possible or practical with insert-mills.

Accordingly, the present invention is directed to inserts and insert mills that have a range of design features that make them functionally and economically competitive with solid end mills at tool cutting diameters (also referred to as "cutting diameter(s)") of 20 mm and less, particularly in the range of 9 to 16 mm. More particularly, in the range of 9 to 12 mm.

A publication of interest is US 2015/0202697, which discloses a three-way indexable insert and tool holder for 90° shoulder milling. It is noted therein, in paragraph [0006], that 90° shoulder milling directs most of the cutting force in the radial direction, in which tool rigidity is low, and, in paragraph [0007], that reduction of the size of the cutting inserts of the prior art will result in the strength thereof being insufficient. The solution provided is primarily directed to sloping angles of the flank portion.

A publication of interest is EP 3050655, which discloses single-sided two-way indexable inserts for small diameter tool holders.

SUMMARY OF THE INVENTION

The present invention provides a single-sided three-way indexable cutting insert for 90° shoulder milling operations for small diameter tool holders. Three indexable positions are typically preferred over the two indexable positions disclosed in EP 3050655, yet the design chosen in EP 3050655 was deliberately chosen to have only two indexable positions, presumably because this was the optimal design conceived by the inventors thereof for small diameter tool holders.

Notably, three-way indexable cutting inserts are disadvantageous in numerous ways when compared with two-way indexable cutting inserts. Firstly, because imprecisions in manufacturing have a greater effect on runout (due to the acute angle formed by the tool abutment surfaces) leading to greater instability during machining. Secondly, because larger dimensions of the cutting insert create greater moment when cutting forces are applied to a cutting edge also leading to greater instability during machining. Thirdly, and perhaps most significantly, because three-way indexable inserts are wider, they are more problematic to design for small diameter tools, as will be further discussed below.

Nonetheless, the present invention conceives that even for very small diameter insert mills (i.e. having a cutting diameter of 9 to 12 mm, or more particularly at about 10 mm) a three-way indexable insert, e.g. of generally triangular shape (at least with respect to the main cutting edges), can provide an overall benefit relative to the known prior art.

As mentioned above, three-way indexable inserts for 90° shoulder milling operations are comparatively wider than, for example, the two-way indexable inserts of the type shown in EP 3050655. Stated differently, they have a relatively larger radial dimension (i.e. in a direction perpendicular to rotation axis when mounted to a tool holder) limiting them to traditionally being used with relatively large diameter tools. The reason for this is because in order to provide a reasonably sized main cutting edge (the main cutting edge for a 90° shoulder milling insert mill being the edge that provides this operation) and three-way symmetry, the radial dimension of the insert is dependent on the length of the main cutting edge. This is not the case with the side bearing surface of the elongated insert type shown in EP 3050655 which has a radial dimension independent of the main edge's cutting edge length, and which can be minimized in accordance with a minimum wall strength required adjacent a screw hole thereof. Since a three-way indexable insert cannot have the radial dimension thereof minimized in the same way, a tool configured for holding such inserts has reduced material at the core thereof. Such reduction being less significant for drills which have primarily axial forces or larger diameters which still have significant core sizes, but are very significant for the present invention relating to small diameter milling tools with significant radial cutting forces. Attention is drawn to FIG. 13 of EP 3050655 in which it can be seen that the core diameter corresponds to roughly to the width of each of the cutting inserts shown. It will be understood that there is a concern that reduction in core diameter can lead to unacceptable bending of the tool holder. While relatively small diameter drills are known, it will be understood that insert mills are subjected to greater radial forces than drills, due to the nature of a milling operation including non-axial movement of the tool holder.

Accordingly, the present invention provides an insert mill for cutting tool diameters of 9 mm to 12 mm, and most particularly to a cutting tool diameter of about 10 mm which is significantly harder to design than insert mills with larger cutting tool diameters, especially when providing three-way indexable inserts.

According to a first aspect of the present invention, there is provided a single-sided three-way indexable cutting insert having a positive basic shape and having a volume ratio $V_S/V_F$ of the void volume $V_S$ and a material volume $V_F$ defined by the amount of material of the cutting insert fulfills the condition: $V_S/V_F \geq 0.30$.

According to a second aspect of the present invention, there is provided a single-sided three-way indexable cutting insert having a positive basic shape and comprising: a rake surface; a base bearing surface located opposite the rake surface; an insert axis $A_I$ extending perpendicular to the base bearing surface and through the center of the insert, the insert axis defining: an upward direction from the base bearing surface towards the rake surface, a downward direction opposite to the upward direction, and an outward direction perpendicular to the upward and downward directions and extending away from the insert axis; a cutting insert height $H_I$ measurable parallel to the insert axis, from the base bearing surface to a highest point of the rake surface; a peripheral surface connecting the rake surface and base bearing surface; a cutting edge formed along an intersection of the peripheral surface and the rake surface, the cutting edge defining, in a view parallel to the insert axis $A_I$, an imaginary edge circumscribed circle $C_E$ having an edge circumscribed diameter $D_E$; and a screw hole opening out to the rake and base bearing surfaces, the screw hole comprising: a screw hole bottom at an intersection with the base bearing surface; a screw hole top at an intersection with the rake surface; a void volume $V_S$ calculated as the volume of a void extending from the screw hole bottom to the screw hole top; and a hole circle $C_S$ defined, in a view parallel to the insert axis $A_I$, at an intersection of the rake surface and the screw hole, the hole circle $C_S$ having a hole diameter $D_S$; the base bearing surface defines, in a view parallel to the insert axis $A_I$, an imaginary base circumscribed circle $C_B$ having a base diameter $D_B$; the peripheral surface comprises: first, second and third abutment surfaces which, in a bottom view along the insert axis, extend parallel with sides of an imaginary equilateral triangle; the cutting edge comprises: exactly three main sub-edges, which are the three longest sub-edges of the cutting edge and which, in a top view parallel to the insert axis $A_I$, each extend along a side of an imaginary equilateral triangle and define an edge inscribed circle $C_M$ having an edge inscribed diameter $D_M$; wherein: the base circumscribed diameter $D_B$ is smaller than the edge circumscribed diameter $D_E$; and a volume ratio $V_S/V_F$ of the void volume $V_S$ and a material volume $V_F$ defined by the amount of material of the cutting insert fulfills the condition: $V_S/V_F \geq 0.30$.

Having a positive basic shape allows an insert's base bearing surface to be relieved (i.e. spaced inwardly from a cutting tool diameter as shown in FIG. 9A) which is important for the present invention, which is directed to extremely small diameter insert mills.

Additionally, allowing a pressing process with as little machining as possible, as disclosed in EP 3050655B1 (par. [0034]), also contributes to the economic advantage of the present design. It will be noted that the term "positive basic shape" more specifically means that cross sectional areas nearer to a base bearing surface of the insert are smaller than cross sectional areas further away therefrom, but does not require all of the peripheral surfaces to be continuously slanted. For example, at certain sections of the insert the surfaces may extend parallel with an insert axis. One way that the positive basic shape is defined is to say that the base circumscribed diameter $D_B$ is smaller than the edge circumscribed diameter $D_E$.

The amount of material of the insert itself can be minimized. It has been found that the volume ratio $V_S/V_F$ defined above has performed successfully. It will be understood that the size of the insert must be minimized while a minimum volume of material is needed for structural strength. Additionally, minimizing the amount of material and providing three indexable positions can provide an economic advantage.

According to a third aspect of the present invention, there is provided a single-sided three-way indexable cutting insert wherein an insert thickness diameter ratio $D_S/D_M$ of the hole diameter $D_S$ and the edge inscribed diameter $D_M$ fulfills the condition: $D_S/D_M > 0.60$.

This aspect is similar to the aspects above in that it defines a minimum volume of material needed for structural strength, albeit in a different way. It will be noted from the drawings that the weakest structural portion of the insert is the material located approximately between the hole diameter $D_S$ and the edge inscribed diameter $D_M$. Accordingly, an insert thickness diameter ratio $D_S/D_M$ according to the value given above performed successfully.

According to a fourth aspect of the present invention, there is provided a single-sided three-way indexable cutting insert with main sub-edges; wherein an edge length ratio $L_M/D_E$ of a main sub-edge length $L_M$ of a shortest one of the main sub-edges, and an edge circumscribed diameter $D_E$ fulfills the condition: $L_M/D_E > 0.40$.

Most preferably, all of the main sub-edges can be the same length, in which case the shortest one can be any main sub-edge.

It will be understood that the difficulty of using inserts with large length ratios $L_M/D_E$ is increased with a greater ratio value. This is because the radial dimension is relatively large since it is dependent on the main sub-edge length $L_M$. Nonetheless it has been found that such insert can be utilized with the present invention.

According to a fifth aspect of the present invention, there is provided a single-sided three-way indexable cutting insert with main sub-edges; wherein an edge circumscribed diameter $D_E$ fulfills the condition: $D_E < 8$ mm.

It will be understood that a reduction in insert size also reduces the chip size that such insert can remove, making it less efficient. Nonetheless, a particularly small insert is required to accommodate two inserts in a small cutting diameter tool holder. This is despite the fact that a two-way indexable insert of similar size would have been far easier to accommodate.

Since the cutting insert of the present invention is small, it has been found that distortion caused by the sintering process is within reasonable tolerances and peripheral grinding of the cutting insert can be avoided. Thus, the insert can be provided with an unground lower sub-surface. As is known in the art, ground surfaces can be identified by grinding lines and discontinuity lines where a planar ground surface ends and an unground surface starts.

While each of the main design features mentioned above (namely, volume ratio, insert thickness diameter ratio, edge length ratio, and small edge circumscribed diameter $D_E$) are believed to be individually advantageous it should be understood that the present invention envisions any combination of any such features on a positive basic shape, three-way indexable single sided insert to be even more advantageous.

Similarly, any of the optional features below can be applied to each aspect above.

It will be understood that a greater volume ratio $V_S/V_F$ utilizes less material. Accordingly, it is preferred that the volume ratio fulfills the condition: $V_S/V_F>0.35$, or even $V_S/V_F>0.40$. An approximated maximum volume ratio for acceptable modern cutting conditions is, theoretically, believed to fulfill the condition: $V_S/V_F<0.50$. With a largest ratio having a reasonable safety factor being $V_S/V_F<0.45$.

Similarly, a greater insert thickness diameter ratio $D_S/D_M$ utilizes less material. Accordingly, it is preferred that the volume ratio fulfills the condition: $D_S/D_M>0.65$. An approximated maximum insert thickness diameter ratio for acceptable modern cutting conditions is, theoretically, believed to fulfill the condition: $D_S/D_M<0.80$. With a largest ratio having a reasonable safety factor being $D_S/D_M<0.75$.

An edge length ratio $L_M/D_E$ allows a larger chip size to be machined. Accordingly, it is preferred that the edge length ratio $L_M/D_E$ fulfills the condition: $L_M/D_E>0.50$, more preferably $L_M/D_E>0.55$. An approximated maximum insert thickness diameter ratio for acceptable modern cutting conditions is, theoretically, believed to fulfill the condition: $L_M/D_E<0.70$. With a largest ratio having a reasonable safety factor being $L_M/D_E<0.65$.

It will be understood that even though the edge circumscribed diameter $D_E$ defined above allows the lower sub-surface to be unground, even smaller sizes will more easily be accommodated by a tool holder. Accordingly, it is preferred that the edge circumscribed diameter $D_E$ fulfills the condition: $D_E<7$ mm, or most preferably $D_E<6.5$ mm.

An approximated minimum feasible size for such three-way indexable insert and capable of acceptable modern cutting conditions is, theoretically, believed to fulfill the condition: $D_E>5$ mm. With a largest edge circumscribed diameter $D_E$ having a reasonable safety factor being $D_E>5.5$ mm.

Preferably, a positive rake angle is formed along the entire cutting edge.

Preferably, a cutting edge comprises a wiper sub-edge between each pair of adjacent main sub-edges, each of the wiper sub-edges forming, in a top view parallel to the insert axis $A_I$, a right angle with an adjacent one of the main sub-edges.

It should be noted that the above defined "right angle" in the present application is not meant to mean exactly 90.0° but rather is within manufacturing tolerances of about 90°±2°, preferably 90°±1°, and most preferably 90°±0.5°.

Each wiper sub-edge has an edge length $L_W$ which can preferably fulfill the condition: $0.5$ mm$<L_W<1.5$ mm.

An insert's peripheral surface can comprise a lower sub-surface and an upper sub-surface; the lower sub-surface extending upwardly and outwardly from the base bearing surface and comprising the first, second and third side abutment surfaces; the upper sub-surface connecting the lower sub-surface and the rake surface, and the upper sub-surface beginning in the upward direction at a minimum upper surface height $H_U$ above the base bearing surface.

It will be understood that a greater minimum upper sub-surface height $H_U$ allows a greater height of the lower sub-surface. The lower sub-surface provides a bearing function and hence a maximized height thereof provides greater stability to the insert when mounted in the pocket. Conversely, sufficient size of the upper sub-surface is needed for the cutting function. Accordingly, it is preferred that the minimum upper sub-surface height $H_U$ fulfills the condition: $0.50 \leq H_I \leq H_U \leq 0.80 H_I$ and most preferably $0.60 H_I \leq H_U \leq 0.75 H_I$.

The at least one overhanging portion can be a single continuous overhanging portion extending along the entire periphery of the insert or can be a plurality of overhanging portions.

Preferably, where a cutting edge comprises one or more wiper sub-edges, a peripheral surface portion located between each wiper sub-edge and the base bearing surface is devoid of an overhanging portion.

Preferably, where a cutting edge comprises one or more wiper sub-edges, a peripheral surface portion located between each main sub-edge and the base bearing surface can comprise an overhanging portion.

Preferably, where a cutting edge comprises main sub-edges and wiper sub-edges, a first relief angle measured at a first point of one of the main sub-edges is larger than a second relief angle measured at a second point of the same main sub-edge, the second point being closer than the first point to a wiper sub-edge which forms a right angle with said main sub-edge. The relief angles can gradually decrease along a main sub-edge from a first area adjacent to a first wiper sub-edge which does not form a right angle with said main sub-edge to a second area adjacent to a second wiper sub-edge which does form a right angle with said main sub-edge.

The cutting insert can preferably be 120° rotationally symmetric about the insert axis. Stated differently, the cutting insert can have three identical sides.

The cutting insert can comprise three identically sized main sub-edges.

According to one preferred example each main sub-edge has an edge length $L_M$ which fulfills the condition: $3$ mm$<L_M<4$ mm.

Most preferably, the base bearing surface is ground. In an embodiment only the base bearing surface of the cutting insert is ground. This is the most economical production of the insert. It will be understood that in all cases it is advantageous when the lower sub-surface is unground.

For greater stability the abutment surface relief angle $\theta$ preferably fulfills the condition $2° \leq \theta \leq 6°$.

In order to provide suitable performance, a cutting edge land width $W_L$ measurable perpendicular to the insert axis taken at any position along the cutting edge fulfills the condition: $W_L \leq 0.14$ mm. Preferably the land width $W_L$ fulfills the condition: $0.02$ mm$\leq W_L \leq 0.14$ mm, or even more preferably $0.03$ mm$\leq W_L \leq 0.11$ mm, and most preferably $0.04$ mm$\leq W_L \leq 0.08$ mm.

According to a sixth aspect of the present invention there is provided a tool holder comprising: two pockets comprising a seat abutment surface; a threaded pocket hole opening out to the seat abutment surface; and first and second lateral abutment surfaces which are straight and oriented at an acute angle to each other in a plan view of the seat abutment surface; each first lateral abutment surface extending in an outward and forward direction; each second lateral abutment surface extending in an outward and rearward direction; the tool diameter $D_T$ fulfilling the condition $D_T<11$ mm.

According to a seventh aspect of the present invention there is provided a tool holder comprising: a rear end; a front end; a tool periphery extending from the rear end to the front end; a rotation axis extending through the center of the tool holder and defining a forward direction extending from the rear end to the front end, a rearward direction opposite to the forward direction, and an outward direction perpendicular to the rotation axis and directed from the rotation axis to the tool periphery; a shank portion extending forward of the rear end; and a cutting portion extending forward of the shank portion to the front end, the cutting portion having a tool diameter $D_T$ at the front end and exactly two circumferentially spaced flutes extending rearwardly from at an intersection of the front end and the tool periphery; each of the flutes comprises a pocket formed at the intersection of the front end and the tool periphery; each of the two pockets comprising: a seat abutment surface; a threaded pocket hole opening out to the seat abutment surface; and first and second lateral abutment surfaces which are straight and oriented at an acute angle to each other in a plan view of the seat abutment surface; each first lateral abutment surface extending in an outward and forward direction; each second lateral abutment surface extending in an outward and rearward direction; and the tool diameter $D_T$ fulfilling the condition $D_T<11$ mm.

It is not believed that tool holders for such small diameters have been produced (with two pockets opening out in the radial direction increasing instability of a front end of the tool holder during a milling operation, and configured for receiving a relatively wide three-way indexable insert).

It will further be noted that the tool holders of the present invention relate only to pockets at the front end of the tool holder. It is conceivable that additional pockets be located rearwardly of the above-defined pockets to produce, e.g. a porcupine type milling cutter. To elaborate, discussion of exactly two pockets refers to circumferentially spaced pockets located at the front end of the tool holder.

Preferably, the acute angle of lateral abutment surfaces of the pocket is 60°.

Preferably, the first lateral abutment surface is shorter than the second lateral abutment surface. This can, e.g., allow the cutting edge to extend forward of the tool holder front end to provide a ramping function.

Preferably, the second lateral abutment surface comprises a recess and thus has first and second lateral abutment sub-surfaces. It will be understood that more space for abutment surfaces is provided on the second lateral abutment surface which is further from the front end than the first lateral abutment surface. Thereby also allowing, e.g., a ramping function.

Preferably, a tool aperture extends through the material of the tool holder and opens out at a first end to one of the pockets and opens out to a second end at the other one of the pockets. It will be understood that preferably a tool holder has material along the center thereof for structural strength. Nonetheless, to accommodate two inserts in a very limited space such as is needed for a tool cutting diameter of about 10 mm, this is one of the design features utilized.

Preferably, the tool aperture opens out to the pocket at a location between the first and second lateral abutment surfaces. Thus, a corner associated with the basically triangular shaped cutting edge can extend into the tool aperture.

Preferably, in a plan view of each seat abutment surface, material extends along the front end from a portion of the first lateral abutment surface closest to the tool axis to the tool periphery. An individually inventive feature added to the present design has been to add material in said location to compensate for the lack of structural strength introduced by the tool aperture.

Preferably, in a plan view of each seat abutment surface, a flute wall extending alongside the pocket curves to extend in the forward and downward directions at the front end. While this may reduce the flute space, it is believed overall advantageous to compensate for lack of structural strength introduced by the tool aperture.

Preferably, the tool holder is devoid of any abutment surface extending along the tool periphery. To facilitate shouldering, all abutment surfaces are preferably located inward of the tool periphery.

Preferably, the tool diameter $D_T$ is as small as possible to compete with solid end mills. With the features described above, a tool diameter $D_T$ fulfilling the condition $D_T<10$ mm has been successfully tested. It will be understood that the tool diameter which is measured at the front end of the tool holder is slightly smaller than the cutting tool diameter $D_C$. An approximated minimum tool diameter is theoretically, believed to fulfill the condition $D_T>9$ mm.

Yet another measure taken to accommodate two inserts in such small diameter has been to adjust their position relative to each other. While it is typically preferred for both inserts to have their rake surfaces generally aligned, in the case of a small diameter tool holder, this is not possible (e.g. since the inserts would touch). The preferred solution of the present invention is to align the inserts so a portion of the peripheral surface of each insert is adjacent each other. With regard to this feature, it can also be described, for example, in relation to the pockets of the tool holder as follows.

In a view of the front end which is parallel to the rotation axis $A_R$: a first imaginary extension line extending from a front edge of one of the seat abutment surfaces can be parallel with a second imaginary extension line extending from a front edge of the other seat abutment surface; a central tool plane $P_C$ is defined parallel to the rotation axis $A_R$, and located between the first and second extension lines such that each seat abutment surface faces the central tool plane $P_C$; a first seat distance $D_{S1}$ is defined from the first extension line to the central tool plane $P_C$; a second seat distance $D_{S2}$ is defined from the second extension line to the central tool plane $P_C$; wherein a total distance $D_{S3}$ which is a sum of the first seat distance $D_{S1}$ and the second seat distance $D_{S2}$ fulfills the condition: $D_{S3}<0.35D_T$. Preferably, the total distance $D_{S3}$ fulfills the condition: $D_{S3}<0.30D_T$. A minimum dimension is preferably $D_S3>0.20D_T$.

Preferably, each seat abutment surface extends parallel to the rotation axis $A_R$.

Preferably, each pocket is identically formed and oriented in the tool holder.

Preferably, a pocket hole can similarly be comparatively large in cross section compared with the distance to the lateral abutment surfaces. This can be seen from a pocket hole diameter and distances to the lateral surfaces and understood given the dimensions of the present invention.

The screw axis can preferably be offset from the center of the seat abutment surface, i.e. slightly more proximate to where the first and second lateral abutment surfaces are closest to each other, so that a screw holding the cutting insert to the pocket will bias the cutting insert towards the first and second lateral abutment surfaces.

According to an eighth aspect of the present invention there is provided an insert mill comprising a tool holder according to the sixth or seventh aspects and at least one insert according to any one of the first to fifth aspects mounted thereto.

According to a ninth aspect of the present invention there is provided an insert mill comprising: a tool holder according to any one of the previous aspects; and a cutting insert according to any one of the previous aspects and which is mounted to one of the pockets of the tool holder; one of the insert's main sub-edges being located outside of the tool diameter $D_T$ and defining a cutting tool diameter $D_C$; wherein, in a side view of the insert mill, said main sub-edge extends parallel to the rotation axis $A_R$. Each of the pockets can have an insert according to any one of the previous aspects mounted to it. Preferably each of the inserts mounted to each of the pockets are identical.

According to a tenth aspect of the present invention there is provided an insert mill comprising: a tool holder comprising: a rear end; a front end; a tool periphery extending from the rear end to the front end; a rotation axis extending through the center of the tool holder and defining a forward direction extending from the rear end to the front end, a rearward direction opposite to the forward direction, and an outward direction perpendicular to the rotation axis and directed from the rotation axis to the tool periphery; a shank portion extending forward of the rear end; and a cutting portion extending forward of the shank portion to the front end, the cutting portion having a tool diameter $D_T$ at the front end and exactly two circumferentially spaced flutes extending rearwardly from at an intersection of the front end and the tool periphery; each of the flutes comprises a pocket formed at the intersection of the front end and the tool periphery having a cutting insert mounted thereto, each pocket opening out in the outward direction such that a main sub-edge of each cutting insert extends past the tool periphery to define a cutting tool diameter $D_C$; each of the cutting inserts comprising an identical cutting edge formed along an intersection of a peripheral surface a rake surface thereof; each cutting edge defining, in a view parallel to an insert axis $A_I$, an imaginary edge circumscribed circle $C_E$ having an edge circumscribed diameter $D_E$; wherein an insert mill ratio $R_{IM}$ defined as $(D_E+D_E)/D_C$ fulfills the condition: $R_{IM}>0.9$.

Preferably, the insert mill ratio $R_{IM}$ fulfills the condition: $R_{IM}>1.0$. A maximum dimension is preferably $D_{S3}<1.4$.

Preferably, in a view of the front end which is parallel to the rotation axis $A_R$, each insert's peripheral surface is adjacent a portion of the other insert's peripheral portion.

Preferably, a total distance $D_{S3}$ is greater than the cutting insert height $H_I$.

BRIEF DESCRIPTION OF THE DRAWINGS

For a better understanding of the subject matter of the present invention, and to show how the same may be carried out in practice, reference will now be made to the accompanying drawings derived from a scale model, in which:

FIG. 7A is a side view of a tool holder of the insert mill shown in FIG. 1A, rotated to show a side view of one of the pockets;

FIG. 7B is a side view of the tool holder in FIG. 7A, rotated to show a front view of one of the pockets;

FIG. 7C is a front end view of the tool holder in FIG. 7A;

FIG. 7D is a perspective view of a portion of the tool holder in FIG. 7A;

DETAILED DESCRIPTION

Figure 1A:
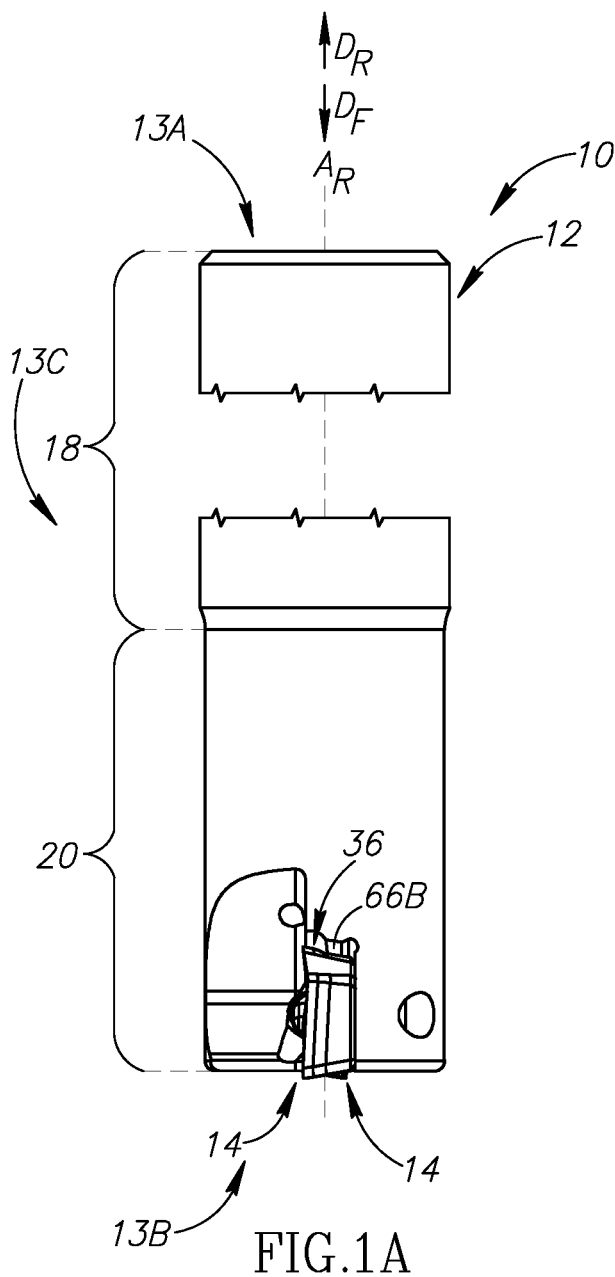
FIG. 1A is a side view of an insert mill comprising a tool holder and inserts according to the subject matter of the present invention, rotated to show a side view of one of the inserts.
Figure 1B:
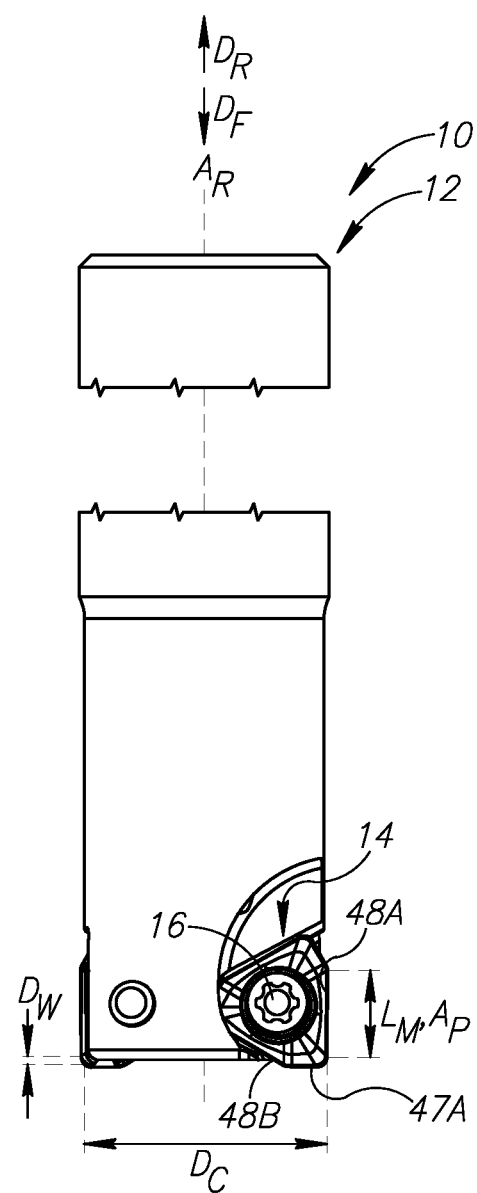
FIG. 1B is a side view of the insert mill in FIG. 1A, rotated to show a front view of one of the inserts.
Figure 1C:
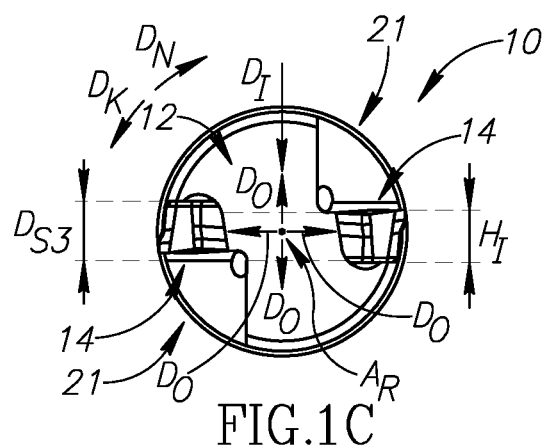
FIG. 1C is a front end view of the insert mill in FIG. 1B.

FIGS. 1A to 1C illustrates an insert mill 10 configured for 90° shoulder milling operations.

The insert mill 10 comprises a tool holder 12, cutting inserts 14 and screws 16 for securing the cutting inserts 14 to the tool holder 12.

The insert mill 10 is configured for rotating about a rotation axis $A_R$ which extends longitudinally through the center thereof.

The rotation axis $A_R$ defines opposite axially forward and rearward directions $D_F$, $D_R$, and opposite rotational cutting and non-cutting directions $D_K$, $D_N$.

The tool holder 12 comprises a rear end 13A, a front end 13B and a tool periphery 13C extending therebetween.

The tool holder 12 further comprises a shank portion 18 and a cutting portion 20 extending forward therefrom.

The cutting portion 20 comprises exactly two flutes 21. Each flute 21 comprises a pocket 22 formed at the intersection of the front end 13B and the tool periphery 13C.

The cutting inserts 14, screws 16 and pockets 22, in the examples given, are identical therefore features described with respect to one should be considered to apply to all.

The cutting insert 14 will now be described with reference to FIGS. 2-6.

The cutting insert 14 is a single-sided three-way indexable cutting insert having a positive basic shape. It comprises a rake surface 24, a base bearing surface 26, a peripheral surface 28, a screw hole 30, and a cutting edge 32.

An insert axis $A_I$ (FIG. 6) extends perpendicular to the base bearing surface 26 and through the center of the insert 14. The insert axis $A_I$ is provided to assist defining directions and features of the cutting insert 14. Generally speaking, while it is most preferred that a screw hole of the present invention is located in the center of an insert and is perpendicular to a base bearing surface, resulting in an insert axis of the insert also extending through the center the screw hole, it will be understood that it is possible a screw hole can be slanted or not perfectly central to a cutting insert, resulting in a screw hole axis (not shown) which is not coaxial with the insert axis $A_I$ (whereas in the present preferred example they are coaxial). Nonetheless, given that the present invention seeks to minimize material usage to the greatest extent possible, certainly for the purposes of structural strength the exemplified central and perpendicular screw hole is preferred. Therefore, in the given example the insert axis $A_I$ also extends through the center of the screw hole 30.

Figure 6:
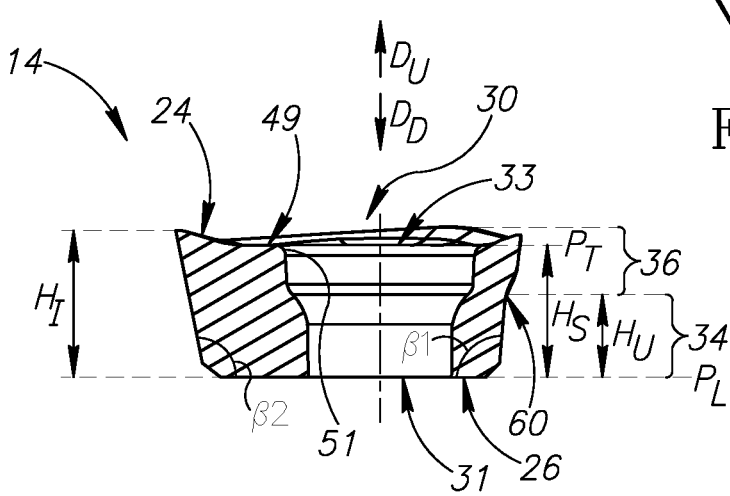
FIG. 6 is a cross-section view taken along line VI-VI in FIG. 5B.

Referring to FIG. 6, the screw hole 30 can comprise a screw hole bottom 31 which opens out to the base bearing surface 26, and a screw hole top 33.

Figure 5A:
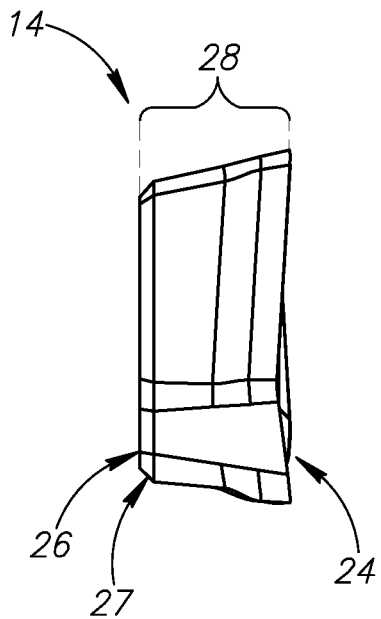
FIG. 5A is a side view of the insert in FIG. 2.
Figure 5B:
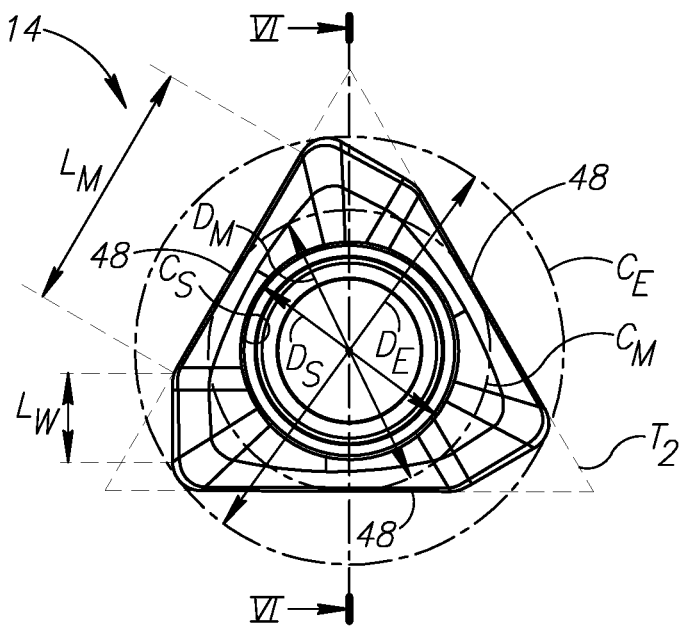
FIG. 5B is a top view of the insert in FIG. 5A.

In FIG. 5B, a hole circle $C_S$ is shown defining a hole diameter $D_S$.

Figure 5C:
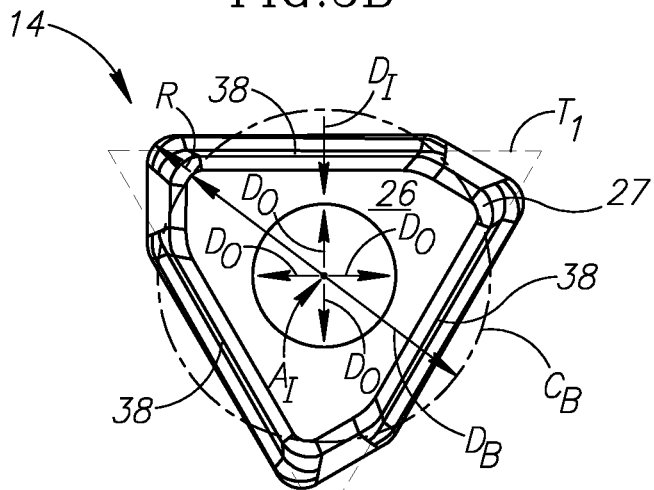
FIG. 5C is a bottom view of the insert in FIG. 5A.

The insert axis $A_I$ defines opposite upward and downward directions $D_U$, $D_D$, and, as exemplified in FIG. 5C, opposite radially inward and radially outward directions $D_I$, $D_O$. The radially outward direction $D_O$ is not meant to define one specific direction but rather all possible 360° outward directions from the insert axis $A_I$, four such directions being exemplified. This is also true, in the opposite direction, for the radially inward direction $D_I$, even though only one example is shown. This is also true for the inward and outward directions $D_I$, $D_O$ shown regarding the insert mill 10 in FIG. 1C.

As shown, for example in FIGS. 4A to 4C and 6, the rake surface 24 can preferably slope inwardly and downwardly from the cutting edge to form an acute internal angle α for chip forming purposes. The acute internal angle α formed between the rake surface 24 and the peripheral surface 28 is also referred to as a positive rake angle. Such positive angle compensates for the orientation of the seat abutment surfaces, which in this non-limiting but preferred example, extend parallel to the rotation axis $A_R$ and hence do not provide a positive cutting angle themselves.

The base bearing surface 26 is generally planar as shown, but it will be understood that this definition does not preclude the possible inclusion of a small rounded transition edge between the peripheral surface and the base bearing surface, as shown for example in FIG. 7 of EP 3050655. In the shown embodiment, a chamfer 27 (FIGS. 5A and 5C) is provided. For the purposes of the specification and claims, the base bearing surface 26 is considered to be the lowest surface, i.e. not including any chamfered or rounded area. Thus, in FIG. 5C, the base bearing surface 26 defines, in a view parallel to the insert axis $A_I$, an imaginary base circumscribed circle $C_B$ having a base diameter $D_B$.

Figures 2, 3:
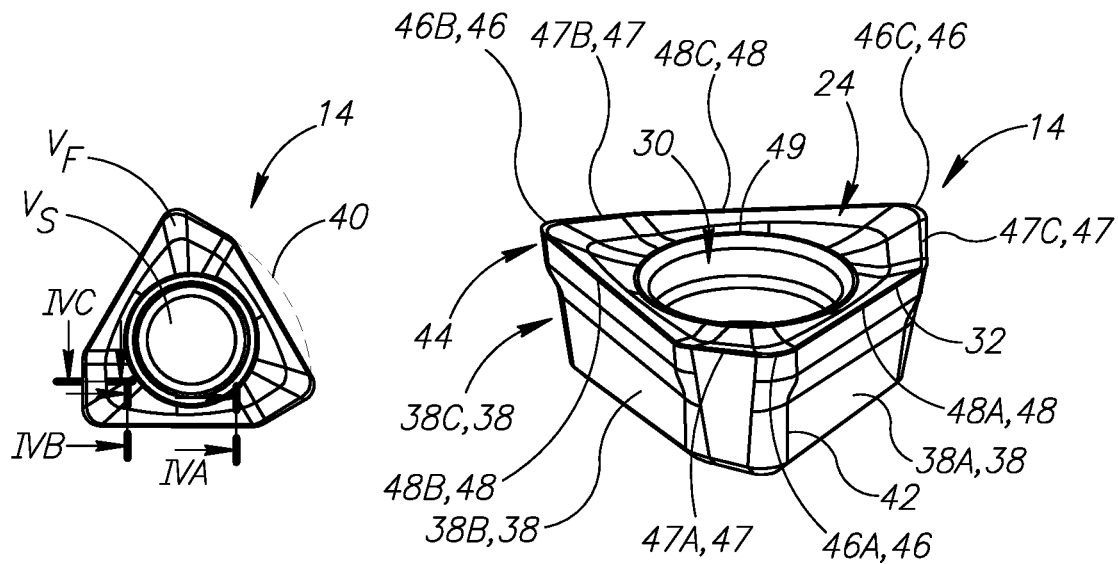
FIG. 2 is a perspective view of one of the inserts shown in FIG. 1A.
FIG. 3 is a top view of the insert in FIG. 2.

Referring to FIGS. 2 and 6, the peripheral surface 28 comprises a lower sub-surface 34 and an upper sub-surface 36. The lower sub-surface 34 is unground and extends upwardly and outwardly from the base bearing surface 26, and comprises first, second, and third side abutment surfaces 38A, 38B, 38C (the third side abutment surface 38C only being shown schematically in FIG. 2, as such side is not shown). Hereinafter the identical side abutment surfaces will be identified generally as "side abutment surface(s) 38").

As shown in FIG. 5C, the side abutment surfaces 38 lie on sides of an imaginary pyramid whose apex is on the insert axis $A_I$, at a point below the base bearing surface 26. The sides of the base bearing surface 26 itself form sides of an imaginary first equilateral triangle T1.

Referring to FIG. 6, the positive basic shape of the cutting insert 14 means that the lower sub-surface 34 forms a first obtuse internal angle $β_1$ with the base bearing surface 26. At the left hand side of the insert 14 as shown in FIG. 6, the section is through the peripheral surface 28 at a portion of a wiper sub-edge which forms a second obtuse internal angle $β_2$ larger than the first obtuse internal angle $β_1$.

Each of the side abutment surfaces 38 is generally planar. To elaborate, an exaggerated schematic convex bulge 40 is shown in FIG. 3. The bulge 40 typically results from a sintering process. Since the inserts of the present invention are small, distortion resulting in such a bulge 40 is accept-ably small enough for the side abutment surface 38 not to require grinding. Generally speaking, such convexity or concavity (not shown; which can be considered an inward "bulge" for the purposes of the specification) is measured as a maximum distance from a plane connecting adjacent corners of an insert to such bulge.

Thus, the insert is stated to have unground lower sub-surface 34. Even though in FIG. 2, for example, it appears to have a discontinuity line 42, this is merely a result of this particular drawing showing a curvature line. An actual product which has not been ground does not have a discernable line, and smoothly transitions from the generally planar portion to the radius.

Figures 4A, 4B, 4C:
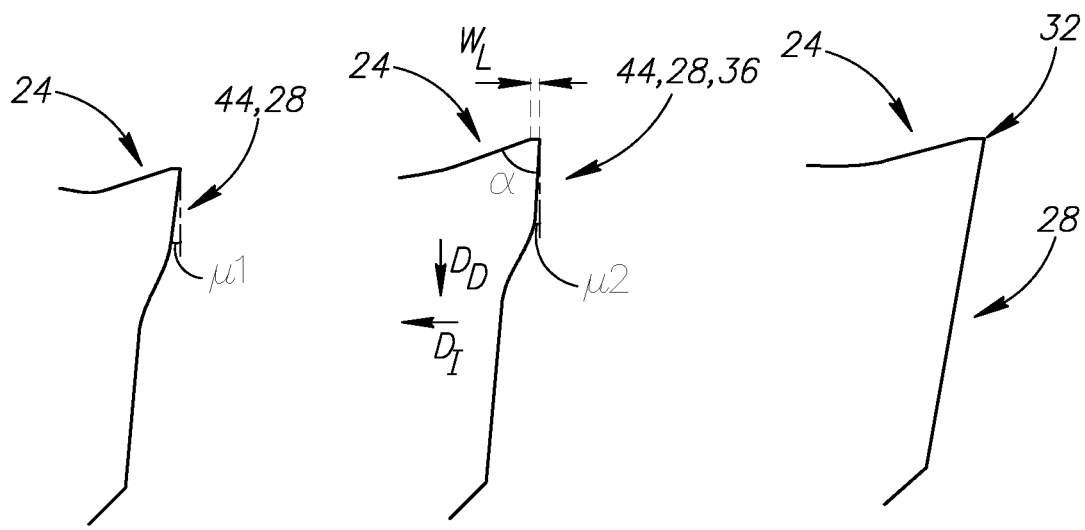
FIG. 4A is a cross-section view taken along line IVA in FIG. 3.
FIG. 4B is a cross-section view taken along line IVB in FIG. 3.
FIG. 4C is a cross-section view taken along line IVC in FIG. 3.

The upper sub-surface 36 comprises at least one overhanging portion 44 (exemplified in FIGS. 4A and 4B).

Referring to FIG. 2, the cutting insert 14 can comprise three identical corner edges 46A, 46B, 46C (hereinafter generally referred to as "corner edge(s) 46"), and three identical straight main sub-edges 48A, 48B, 48C (hereinafter generally referred to as "main sub-edge(s) 48"). Preferably, three identical wiper sub-edges 47A, 47B, 47C (hereinafter generally referred to as "wiper sub-edge(s) 47") extend at right angles between the corner edges 46 and the main sub-edges 48 (i.e. only extending at a right angle in the clockwise direction as shown in a top view, such as that shown in FIG. 3).

Referring to FIG. 5B, there is shown an imaginary edge circumscribed circle $C_E$ having an edge circumscribed diameter $D_E$. The imaginary edge circumscribed circle $C_E$ is a minimum diameter circle which encircles the entire cutting edge 32 including the main sub-edges 48, the corner edges 46 and the wiper sub-edges 47.

The three main sub-edges 48 extend along a side of a second imaginary equilateral triangle T2, and define an edge inscribed circle $C_M$ having an edge inscribed diameter $D_M$.

Dimensions of various features are shown as follows: each corner edge 46 can have a radius R (FIG. 5C); each main sub-edge 48 can have a main sub-edge length $L_M$ measured from the transition point of the radius to an intersection with a wiper sub-edge (FIGS. 1B, 5B); each wiper sub-edge 47 can have a wiper edge length $L_W$ measured from the transition point of the radius to an intersection with a main sub-edge (FIG. 5B); and a cutting edge land width $W_L$ is shown in FIG. 4B.

Referring to FIG. 6, a void volume $V_S$ of the cutting insert 14 is defined by the boundaries of the screw hole 30. Specifically, a screw hole height $H_S$ is defined from the base bearing surface 26 to an upper edge 49 of the screw hole 30 (also designated in FIG. 4). Stated differently, the void volume $V_S$ is calculated as the volume of the void extending from a bottom of the screw hole 30, defined at a lower plane $P_L$ perpendicular to the insert axis $A_I$, to a top of the screw hole 30, defined at an upper plane $P_T$ a perpendicular to the intersection of the screw hole 30 and the rake surface 24, i.e. at the height of the upper edge 49. More precisely, the screw hole's upper edge 49 is an intersection of a curved corner 51 and the rake surface 24.

The material volume $V_F$ is the volume of the actual material of which the cutting insert 14 is made.

Each side abutment surface 38 extends upwardly and outwardly from the base bearing surface 26 at an obtuse internal angle $β_1$ shown in FIG. 6.

A cutting insert height $H_I$ extends from the base bearing surface 26 to a highest point of the rake surface 24 (noting the cutting edge 32 is a part of the rake surface).

FIG. 4C shows that at least the portion shown is devoid of an overhanging portion 44, whereas FIGS. 4A and 4B show portions which have an overhanging portion. The at least one overhanging portion 44 has a lowermost point 60 at the minimum upper sub-surface height $H_U$ above the base bearing surface 26.

The upper sub-surface 36 (FIG. 6A) begins, in the upward direction, at a minimum upper sub-surface height $H_U$ above the base bearing surface 26, the minimum upper sub-surface height $H_U$ being measurable parallel to the insert axis $A_I$.

FIG. 4A shows a first relief angle $\mu_1$. FIG. 4B shows a second relief angle $\mu_2$. The first relief angle $\mu_1$ is larger than the second relief angle $\mu_2$. The larger relief angle, the first relief angle $\mu_1$ is provided for when the area of the main sub-edge is used for a ramping operation and a larger relief is required. However the area of the same main sub-edge shown by FIG. 4B is never used for a ramping operation and can have a preferred smaller relief angle which provides more structural strength. While only two sections have been shown, it will be understood that the change in relief angles can be gradual.

Referring now to FIGS. 7A to 8C, the pocket 22 comprises a seat abutment surface 62, a threaded pocket hole 64 opening out to the seat abutment surface 62 and defining a minimal pocket hole inscribed circle $I_P$ and an associated minimal pocket hole diameter $D_P$, first and second lateral abutment surfaces 66A, 66B oriented at an acute angle to each other in a plan view (i.e. the view in FIG. 8C) of the seat abutment surface 62.

As shown in FIG. 7B each first lateral abutment surface 66A extends in an outward and forward direction ($D_O$, $D_F$); each second lateral abutment surface 66B extends in an outward and rearward direction ($D_O$, $D_R$).

The second lateral abutment surface 66B comprises a recess 67. The use of a recess 67 helps define contact points of the insert 14 and the pocket 22. Notably the contact points are shown with hatch lines in FIG. 8A.

The pocket hole 64 can similarly be comparatively large in cross section compared with the distance to the lateral abutment surfaces. This can be seen from the pocket hole diameter $D_P$ and the distances from the pocket hole 64 to the lateral abutment surfaces 66A, 66B.

The first and second lateral surfaces 66A, 66B are preferably typically oriented at the same obtuse internal angle $\beta_3$ as the insert's abutment surfaces 38.

A screw axis $A_S$ can preferably be offset from a center of the seat abutment surface, i.e. slightly more proximate to where the lateral surfaces are closest to each other (i.e. the area generally designated 68) so that a screw holding the cutting insert to the pocket will bias the cutting insert towards the lateral surfaces.

Referring to FIG. 7C, a first imaginary extension line $L_1$ extending from a front edge 72 of one of the seat abutment surfaces 62 can be parallel with a second imaginary extension line $L_2$ extending from a front edge 74 of the other seat abutment surface 62. A central tool plane $P_C$ contains the rotation axis $A_R$, and is located between the first and second extension lines $L_1$, $L_2$ such that each seat abutment surface 62 faces the central tool plane $P_C$. A first seat distance $D_{S1}$ is defined from the first extension line $L_1$ to the central tool plane $P_C$. A second seat distance $D_{S2}$ is defined from the second extension line $L_2$ to the central tool plane $P_C$. A total distance $D_{S3}$ which is a sum of the first seat distance $D_{S1}$ and the second seat distance $D_{S2}$. In some embodiments, the first seat distance $D_{S1}$ and the second seat distance $D_{S2}$ equal each other. Also in some embodiments, the two seat abutment surfaces 62 have 180° rotational symmetry about the tool's rotation axis $A_R$, in the front view of the tool 12, as seen in FIG. 7C.

Referring to FIG. 1C, a total distance $D_{S3}$ is greater than the cutting insert height $H_I$. It will be understood that the inserts cannot remain with their rake surfaces aligned as there is insufficient space given the dimensions. It will also be understood that if the inserts are positioned with their peripheral surfaces distant from each other instead of the present arrangement (i.e. if the insert on the right side of FIG. 7C would be moved towards the bottom of the page and the insert on the left side towards the top) then the tool holder structural strength for the pocket 22 will be weakened (as there is less material supporting the insert). Conversely, if the inserts 14 are moved in the opposite direction, there might be insufficient chip evacuation space in the flutes. Accordingly, the most preferred arrangement is with the inserts' peripheral surfaces adjacent each other.

Figure 9A:
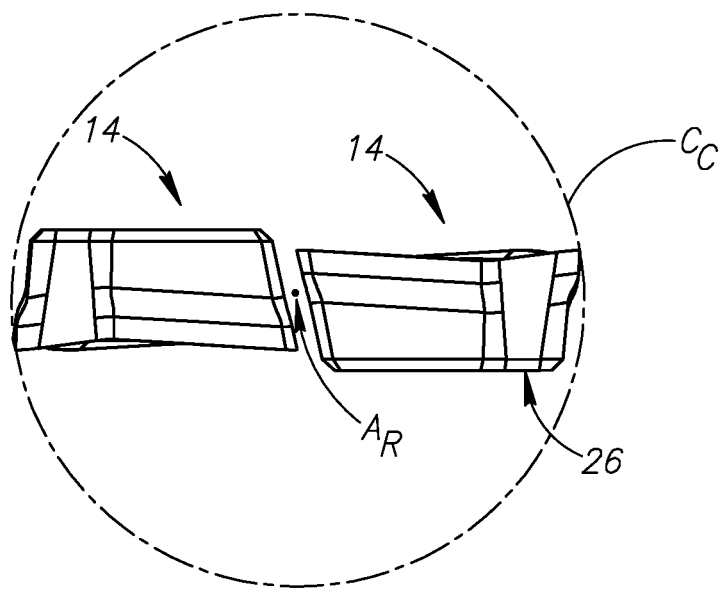
FIG. 9A is a view of the inserts shown in FIG. 1C, without the tool holder and screws being shown, and schematically showing the tool circumscribing cutting diameter circle.
Figure 9B:
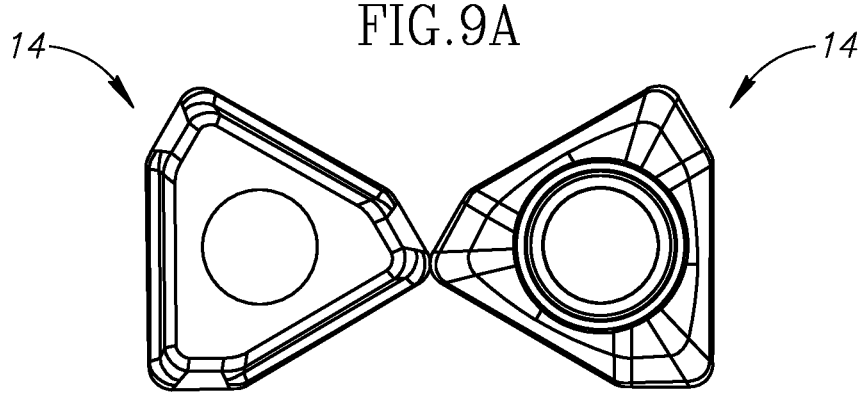
FIG. 9B is a side view of the inserts shown in FIG. 9A, also corresponding to the orientation of the inserts as shown in FIG. 1B.
Figure 9C:
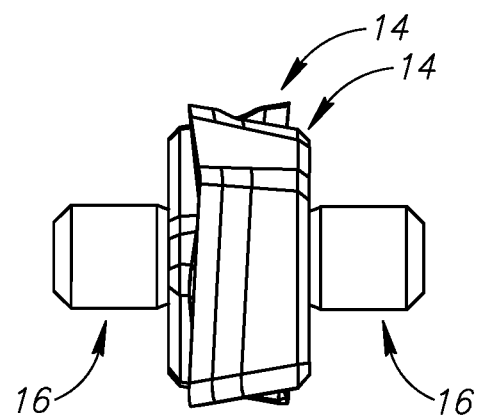
FIG. 9C is a side view of the inserts shown in FIG. 9B, and the screws for mounting same to the tool holder, rotated to correspond to the orientation of the inserts as shown in FIG. 1A.

Referring to FIGS. 9A and 9B, it will be noticed that in such view the cutting inserts actually reach a common radial position. The only reason they do not touch as per the appearance in FIG. 9B is because they have their positive basic shape and their positioning as shown in FIG. 9A (i.e. the cutting edges are not adjacent and each insert's peripheral surface is adjacent a portion of the other insert's peripheral portion). Using such features is one way to mount relatively large inserts (relative to the tool holder diameter) in a relatively small circumscribing cutting diameter circle $C_C$. The ratio for these features is described above.

Figure 8A:
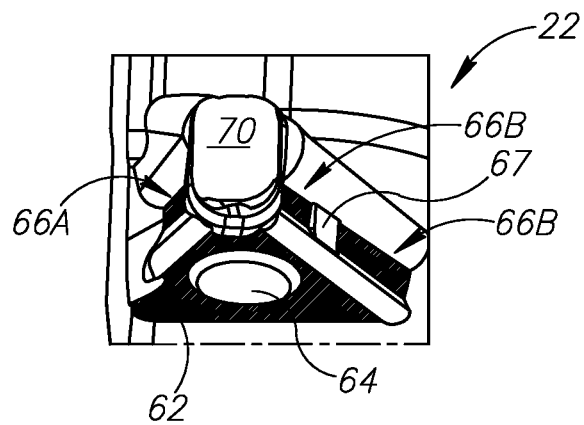
FIG. 8A is a perspective view of a pocket of the tool holder in FIG. 7A.
Figure 8B:
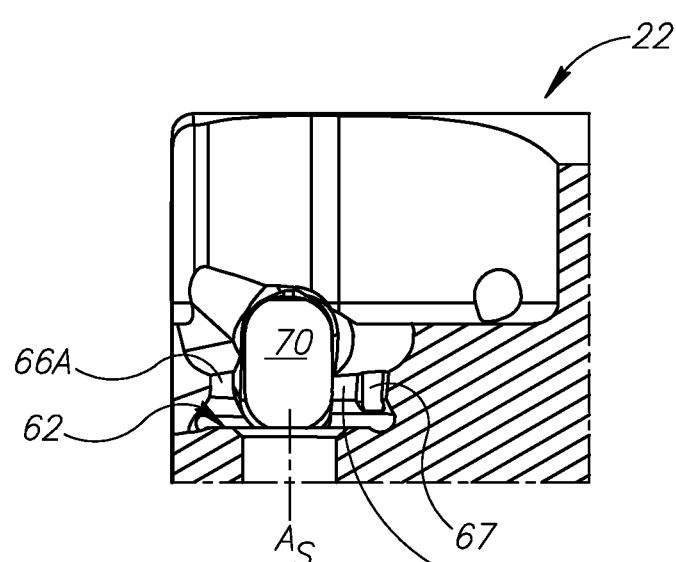
FIG. 8B is a side view of the pocket in FIG. 8A.
Figure 8C:
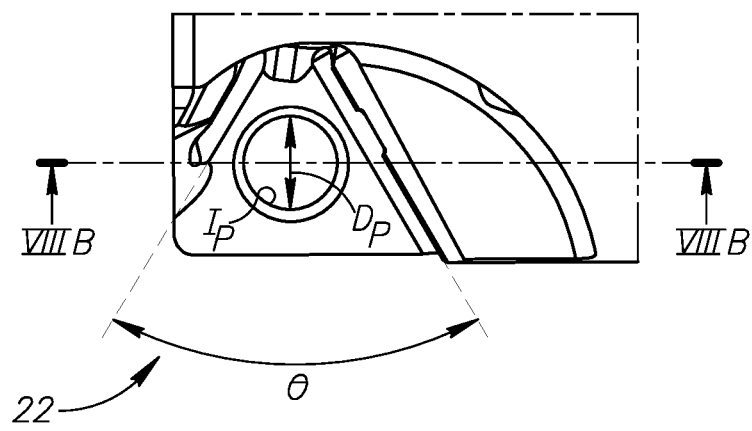
FIG. 8C is a top (i.e. axial) view of the pocket in FIG. 8A, and also constitutes a plan view of the seat abutment surface of the pocket.

Because of the proximity of the inserts 14, reverting to FIGS. 8A to 8C, a tool aperture 70 is provided.

To compensate for the weakening caused by the aperture, material 76 has been added at the front end 13B.

When mounted, the screw 16 secures the cutting insert 14 such that the base bearing surface 26 abuts the seat abutment surface 62, one of the abutment surfaces 38 abuts the first lateral surface 66A, and an adjacent abutment surface 38 abuts the second lateral surface 66B at the two portions thereof. It will be understood that the cutting insert 14 can be repositioned three times in the pocket 22 and that the exact designation of which specific abutment surfaces contact at any given time is not important.

It is noted, for example from FIG. 1A, that the upper sub-surface 36 does not contact the tool holder 12 and therefore inserts with slightly different cutting edges can be mounted to the same tool holder 12.

The pocket 22, or more precisely, each seat abutment surface 62 extends parallel or approximately parallel to the rotation axis $A_R$, as best shown in FIG. 7A.

In FIG. 1B, for the insert mill 10 exemplified, one of the straight cutting edges (for example the second straight edge 47A) performs a wiper function and only protrudes a small wiper distance $D_W$ from the tool holder. In this example, the first main sub-edge 48A is the main cutting edge for providing a 90° shoulder milling operation.

Since various techniques have been used to allow a larger insert, and more particularly a larger main sub-edge, a comparatively large cut depth $A_P$ is achievable for a comparatively very small cutting insert.

Finally it is noted that a ramping function can be provided by a small portion of the third sub-edge 48C (FIG. 1B).

What is claimed is:

1. A single-sided three-way indexable cutting insert having a positive basic shape and comprising:
    a rake surface;
    a base bearing surface located opposite the rake surface;
    an insert axis ($A_I$) extending perpendicular to the base bearing surface and through the center of the insert, the insert axis defining: an upward direction from the base bearing surface towards the rake surface, a downward direction opposite to the upward direction, and an outward direction perpendicular to the upward and downward directions and extending away from the insert axis;

a cutting insert height $H_I$ measurable parallel to the insert axis, from the base bearing surface to a highest point of the rake surface;

a peripheral surface connecting the rake surface and base bearing surface;

a cutting edge formed along an intersection of the peripheral surface and the rake surface, the cutting edge defining, in a top view parallel to the insert axis ($A_I$), an imaginary edge circumscribed circle ($C_E$) having an edge circumscribed diameter $D_E$; and a screw hole opening out to the rake and base bearing surfaces, the screw hole comprising:
  a screw hole bottom at an intersection with the base bearing surface;
  a circular screw hole top at an intersection with the rake surface;
  a void volume $V_S$ defined as the volume of a void extending from the screw hole bottom to the screw hole top; and
  a hole circle ($C_S$) defined, in said top view parallel to the insert axis ($A_I$), at an intersection of the rake surface and the screw hole, the hole circle ($C_S$) having a hole diameter $D_S$;

the base bearing surface defines, in a bottom view parallel to the insert axis ($A_I$), an imaginary base circumscribed circle ($C_B$) having a base diameter $D_B$;

the peripheral surface comprises:
  first, second and third abutment surfaces which, in said bottom view along the insert axis, extend parallel with sides of an imaginary equilateral triangle;

the cutting edge comprises:
  exactly three main sub-edges, which are the three longest sub-edges of the cutting edge and which, in said top view parallel to the insert axis ($A_I$), each extend along a side of an imaginary equilateral triangle and define an edge inscribed circle ($C_M$) having an edge inscribed diameter $D_M$;

wherein:
the edge circumscribed diameter $D_E$ fulfills the condition: $D_E < 6.5$ mm;
the base circumscribed diameter $D_B$ is smaller than the edge circumscribed diameter $D_E$;
a volume ratio $V_S/V_F$ of the void volume $V_S$ and a material volume $V_F$ defined by the amount of material of the cutting insert fulfills the condition: $0.5 > V_S/V_F \geq 0.30$;
an insert thickness diameter ratio $D_S/D_M$ of the hole diameter $D_S$ and the edge inscribed diameter $D_M$ fulfills the condition: $0.8 > D_S/D_M > 0.60$;
an edge length ratio $L_M/D_E$ of a main edge length $L_M$ of a shortest one of the main sub-edges, and the edge circumscribed diameter $D_E$ fulfills the condition: $0.7 > L_M/D_E > 0.40$; and
the peripheral surface comprises a lower sub-surface and an upper sub-surface; the lower sub-surface extending upwardly and outwardly from the base bearing surface and comprising the first, second and third side abutment surfaces; the upper sub-surface connecting the lower sub-surface and the rake surface, and the upper sub-surface beginning in the upward direction at a minimum upper sub-surface height $H_U$ above the base bearing surface; and wherein the minimum upper sub-surface height $H_U$ fulfills the condition: $0.50 H_I \leq H_U \leq 0.80 H_I$.

2. The cutting insert according to claim 1, wherein the volume ratio fulfills the condition: $V_S/V_F > 0.35$.

3. The cutting insert according to claim 1, wherein the edge circumscribed diameter $D_E$ fulfills the condition: $D_E > 5$ mm.

4. The cutting insert according to claim 1, wherein the cutting edge comprises a wiper sub-edge between each pair of adjacent main sub-edges, each of the wiper sub-edges forming, in said top view parallel to the insert axis ($A_I$), a right angle with an adjacent one of the main sub-edges.

5. The cutting insert according to claim 4, wherein each wiper sub-edge has an edge length $L_W$ which fulfills the condition: $0.5$ mm $< L_W < 1.5$ mm.

6. The cutting insert according to claim 5, wherein the cutting edge comprises exactly three main sub-edges and exactly one wiper sub-edge between each pair of adjacent main sub-edges.

7. The cutting insert according to claim 1, wherein a first relief angle measured at a first point of one of the main sub-edges is larger than a second relief angle measured at a second point of the same main sub-edge, the second point being closer than the first point to a wiper sub-edge which forms a right angle with said main sub-edge.

8. The cutting insert according to claim 7, wherein relief angles gradually decrease along said main sub-edge from a first area adjacent to a first wiper sub-edge which does not form a right angle with said main sub-edge to a second area adjacent to a second wiper sub-edge which does form a right angle with said main sub-edge.

9. An insert mill comprising:
  a tool holder comprising:
    a rear end;
    a front end;
    a tool periphery extending from the rear end to the front end;
    a rotation axis extending through the center of the tool holder and defining a forward direction extending from the rear end to the front end, a rearward direction opposite to the forward direction, and an outward direction perpendicular to the rotation axis and directed from the rotation axis to the tool periphery;
    a shank portion extending forward of the rear end; and
    a cutting portion extending forward of the shank portion to the front end, the cutting portion having a tool diameter $D_T$ at the front end and exactly two circumferentially spaced flutes extending rearwardly from an intersection of the front end and the tool periphery;
    each of the flutes comprises a pocket formed at the intersection of the front end and the tool periphery; and
  a cutting insert according to claim 1 mounted in each of the pockets of the tool holder;
  wherein:
    one of each insert's main sub-edges is located outside of the tool diameter and defines a cutting tool diameter $D_C$; and
    in a side view of the insert mill, said main sub-edge located outside of the tool diameter extends parallel to the rotation axis (AR).

10. The insert mill according to claim 9, wherein:
each pocket comprises:
  a seat abutment surface;

a threaded pocket hole opening out to the seat abutment surface; and first and second lateral abutment surfaces which are straight and oriented at an acute angle to each other in a plan view of the seat abutment surface;

each first lateral abutment surface extends in an outward and forward direction;

each second lateral abutment surface extends in an outward and rearward direction; and the tool diameter $D_T$ fulfills the condition $D_T<11$ mm.

11. The insert mill according to claim 10, wherein a tool aperture extends through material of the tool holder and opens out at a first end to one of the pockets and opens out to a second end at the other one of the pockets.

12. The insert mill according to claim 10, wherein in said plan view of each seat abutment surface, material of the tool holder extends along the front end, from a portion of the first lateral abutment surface which portion is closest to the tool axis to the tool periphery.

13. The insert mill according to claim 10, wherein in said plan view of each seat abutment surface, a flute wall extending alongside the pocket curves to extend in the forward and downward directions at the front end.

14. The insert mill according to claim 10, wherein, in said plan view of each seat abutment surface, the tool holder is devoid of any abutment surface extending along the tool periphery.

15. The cutting insert according to claim 1, wherein:

the cutting edge comprises a wiper sub-edge between each pair of adjacent main sub-edges, each of the wiper sub-edges forming, in said top view parallel to the insert axis ($A_I$), a right angle with an adjacent one of the main sub-edges;

each wiper sub-edge has an edge length $L_W$ which fulfills the condition: 0.5 mm$<L_W<$1.5 mm;

the cutting edge comprises exactly three main sub-edges and exactly one wiper sub-edge between each pair of adjacent main sub-edges;

a first relief angle measured at a first point of one of the main sub-edges is larger than a second relief angle measured at a second point of the same main sub-edge, the second point being closer than the first point to a wiper sub-edge which forms a right angle with said main sub-edge; and the relief angles gradually decrease along said main sub-edge from a first area adjacent to a first wiper sub-edge which does not form a right angle with said main sub-edge to a second area adjacent to a second wiper sub-edge which does form a right angle with said main sub-edge.

* * * * *